US006177027B1

(12) United States Patent
Zaid et al.

(10) Patent No.: US 6,177,027 B1
(45) Date of Patent: Jan. 23, 2001

(54) IRON-COMPLEXING COMPOSITIONS CONTAINING STANNOUS CHLORIDE

(75) Inventors: Gene H. Zaid, Sterling; Beth Ann Wolf, Hutchinson, both of KS (US)

(73) Assignee: Jacam Chemicals L.L.C., Sterling, KS (US)

( * ) Notice: Under 35 U.S.C. 154(b), the term of this patent shall be extended for 0 days.

(21) Appl. No.: 09/435,056

(22) Filed: Nov. 8, 1999

Related U.S. Application Data

(62) Division of application No. 09/082,035, filed on May 20, 1998.

(51) Int. Cl.[7] ............................. C01B 31/16; C09K 3/00; C08J 5/20; B01J 49/00
(52) U.S. Cl. ...................... 252/184; 252/182.35; 521/26; 210/670
(58) Field of Search ........................ 252/182.35, 184; 521/26; 210/670, 673

(56) References Cited

U.S. PATENT DOCUMENTS

| | | |
|---|---|---|
| 2,128,161 | 8/1938 | Morgan . |
| 2,227,860 | 1/1941 | Morgan et al. . |
| 2,759,891 | 8/1956 | Rohrback et al. . |
| 3,536,637 * | 10/1970 | Noll et al. ................. 521/26 |
| 3,887,498 * | 6/1975 | Kuhajek et al. ........... 210/670 |
| 3,977,968 * | 8/1976 | Odland ....................... 210/670 |
| 4,116,860 * | 9/1978 | Kunin ........................ 252/184 |
| 4,477,355 * | 10/1984 | Liberti et al. .............. 210/670 |
| 4,540,715 * | 9/1985 | Waatti et al. ............... 521/26 |
| 4,839,086 * | 6/1989 | Zaid ........................... 252/184 |
| 5,082,567 * | 1/1992 | Fritts et al. ................ 210/670 |
| 5,441,689 * | 8/1995 | Laity ......................... 210/670 |
| 5,474,704 * | 12/1995 | Zaid ........................... 252/184 |
| 5,514,200 | 5/1996 | Lovatt . |

OTHER PUBLICATIONS

Chem. Abstracts 116:200836, (1991).
Chem. Abstracts 125:64852, (1996).
Chem. Abstracts 109:79478, (1987).

* cited by examiner

*Primary Examiner*—Philip Tucker
(74) *Attorney, Agent, or Firm*—Hovey, Williams, Timmons & Collins

(57) ABSTRACT

Iron-complexing or scavenging compositions are provided having particular utility as downhole well treatments or as a part of regenerating media for cation exchange resins. The compositions may be in dry or liquid form and preferably include stannous chloride, an acid selected from the group consisting of phosphorous acid, phosphoric acid and mixtures thereof, and sodium hexametaphosphate.

9 Claims, No Drawings

IRON-COMPLEXING COMPOSITIONS CONTAINING STANNOUS CHLORIDE

RELATED APPLICATION

This is a division of application Ser. No. 09/082,035 filed May 20, 1998 now pending.

BACKGROUND OF THE INVENTION

1. Field of the Invention

The present invention is broadly concerned with improved iron-complexing or scavenging compositions in solid or liquid form which include $Sn^{+2}$ ion preferably derived from stannous chloride, as well as phos-acid(s) and alkali metal hexametaphosphate. The compositions of the invention can be used as a downhole well treatment or with sodium chloride to form a regenerating medium for cation exchange resins used in water softening systems.

2. Description of the Prior Art

Water softening systems have long been used in households and by industry to replace hardness cations such as calcium and magnesium with sodium ions. This is accomplished by passing an incoming water supply through a bed of sodium charged cation exchange resin beads or particles. As the water passes through the cation exchange resin bed, the incident hardness cations are exchanged for the sodium ions of the bed. In the course of time, the ion exchange resin bed becomes saturated with hardness cations removed from the incoming water, and it is necessary to recharge the bed by passing a brine solution primarily consisting of sodium chloride through the resin bed. This replenishes the bed with sodium ions and removes unwanted calcium, magnesium, or other ions previously removed from the water.

Over time, the exchange capacity of an ion exchange resin bed deteriorates as impurities in the incoming water collect in the resin bed and are not removed by periodic recharging. At some point, depending primarily on the characteristics of the incoming water supply, the resin bed becomes unacceptably "fouled," i.e., the resin bed's capacity to soften water has been diminished to an extent that it must be specially treated to restore softening capacity.

Although a number of factors can lead to fouling of an ion exchange resin bed, perhaps the greatest single contributing factor is the presence of iron in an incoming water supply. Iron can exist in several valence states in water, the most common being the ferrous and ferric states. It is most desirable to maintain the iron in the ferrous state, inasmuch as ferrous iron can readily be removed during conventional resin bed regeneration. However, ferrous iron tends to become oxidized to the ferric state after being exchanged onto a resin bed, which makes its removal very difficult and can cause the resin beads to split.

Iron also presents significant problems in the context of oil well drilling operations. For example, excessive iron in oil well fluids can lead to the formation of viscous downhole emulsions which can block flow and significantly minimize oil production. Accordingly, oil well operators need to carefully monitor and to the extent possible inhibit the formation of viscous emulsions of this type.

SUMMARY OF THE INVENTION

The present invention overcomes the problems outlined above and provides novel products in the form of solids mixtures and aqueous dispersions which can be used as a part of cation exchange resin regenerating media or in the context of downhole well treatments. The compositions of the invention have the ability to complex or scavenge iron in its various valence forms, and broadly include $Sn^{+2}$ ion as well as phos-acid(s), i.e., an acid selected from the group consisting of phosphorous acid, phosphoric acid and mixtures thereof, where the phos-acid(s) can be in any form such as ortho-, meta- or polyphosphoric acids such as pyrophosphoric and more complex poly acids. The most preferred source of $Sn^{+2}$ ion is stannous chloride, $SnCl_2$.

In addition, the compositions of the invention generally include an alkali metal hexametaphosphate such as sodium hexametaphosphate, and may also have therein minor amounts of EDTA. In the case of solids mixtures, anti-caking agents or other similar additives may be employed.

Broadly, the compositions of the invention contain from about 0.3–15% by weight $Sn^{+2}$ ion, which is generally derived from a corresponding salt such as a halide salt, particularly $SnCl_2$. The phos-acid component is preferably phosphorous acid in the context of solid products and concentrated polyphosphoric acids for liquids. The phos-acid component is generally present at a level of from about 0.1–75% by weight; this solids preferably include from about 0.1–10% by weight acid, whereas the liquids have from about 0.1–75% by weight thereof. The hexametaphosphate is present at a level of from about 0.5–95% by weight; in solid products the preferred hexametaphosphate content is from about 50–95% by weight, whereas in liquids the level of use is from about 0.5–50% by weight.

The compositions of the invention can be used to form regenerating media for cation exchange resins. This involves mixing minor amounts of an $Sn^{+2}$ ion source and phos-acid(s) with a preponderant amount of sodium chloride. This can be done in the dry form or as a liquid. Alternately, the compositions of the invention can be used as an oil well treatment agent which involves introducing the aqueous dispersions directly into the oil well for the purpose of preventing or breaking the formation of viscous oil emulsions.

DETAILED DESCRIPTION OF THE PREFERRED EMBODIMENTS

As indicated, the present invention is directed to solid products and dispersions each containing $Sn^{+2}$ ion and phos-acid(s), as well as a regenerating medium for cation exchange resins and corresponding methods. For ease of understanding, the different aspects of the invention are described separately.

Solid Mixtures

The solid mixtures in accordance with the invention can be used as downhole well treatments or as a part of cation exchange regenerating media. The solids are preferably made up of a source of $Sn^{+2}$ ion ($Sn^{+2}$ ion present at a level of from about 0.3–15% by weight, more preferably from about 0.3–7% by weight) and an acid selected from the group consisting of phosphorous acid, phosphoric acid and mixtures thereof, most particularly phosphorous acid. Stannous chloride is preferably used at a level of from about 0.5–25% by weight, and more preferably at a level of from about 0.5–10% by weight. The acid component is used at a level of from about 0.1–10% by weight, and more preferably from about 0.25–5% by weight. The single most preferred acid is phosphorous acid, and a 1% by weight solution of the overall mixture in water at room temperature normally would have a pH in the range of about 3–4. The preferred compositions also include an alkali metal hexametaphosphate therein, especially sodium hexametaphosphate. The hexametaphosphate component is used at a level of from about 50–95% by weight, more preferably from about 90–95% by weight. The hexametaphosphate will usually change the pH of the compositions in water to about 4–5. EDTA can also be used in these compositions, generally at trace levels of up to about 1% by weight.

Aqueous Dispersions

In this form of the invention, respective quantities of $Sn^{+2}$ ion and phosphorous and/or phosphoric acid are dispersed in an aqueous medium, typically water, dilute acids or brines. Usually, hexametaphosphate is also present. The liquid dispersions find particular utility as downhole well treatments and as an additive adapted to be added to sodium chloride for the purpose of creating a regenerating medium for cation exchange resins.

In the case of downhole well treatments, the aqueous dispersions generally have from about 0.3–15% by weight $Sn^{+2}$ ion therein, more preferably from about 0.3–5% by weight $Sn^{+2}$ ion; $SnCl_2$ is the most preferred source of $Sn^{+2}$ ion, used at a level of from about 0.5–25% by weight, more preferably 0.5–7% by weight. The phos-acid(s) is present at a level of from about 0.1–75% by weight, more preferably from about 25–60% by weight. The most preferred phos-acid is concentrated polyphosphoric acid. The hexametaphosphate component is used at a level of from about 0.5–50% by weight, more preferably from about 1–25% by weight. EDTA if used is present at trace amounts of up to about 1% by weight. The pH of the dispersions is from about 4–5. The method of use of these dispersions involves introducing into a well the dispersions by any conventional means.

Regenerating Media

Regenerating media are made up of a preponderant amount of sodium chloride as well as from about 0.01–2% by weight (more preferably from about 0.1–0.5% by weight) of the above-described solid mixtures or aqueous dispersions. These media are prepared by simply mixing the salt with the dry or liquid compositions as the case may be. The media of the invention are used in the same manner as conventional cation exchange resin regenerating media.

The following examples set forth preferred compositions in accordance with the invention, as well as certain test data demonstrating the iron-scavenging capabilities thereof. It is to be understood that these examples are provided by way of illustration only and nothing therein should be taken as a limitation upon the overall scope of the invention.

Example 1

In this example, eight 100 ml bottles each containing 50 ml tap water and 5000 ppm of ferrous/ferric chloride were prepared and used to study the iron-complexing ability of eight separate aqueous test solutions. The iron-containing solutions initially exhibited a yellowish tint, and sufficient amounts of the test solutions were added to corresponding iron-containing solutions to clear them, thus indicating that the iron had been complexed.

Solution #1 was a solution containing 15% phosphorous acid in water; solution #2 was a solution containing 15% sodium hexametaphosphate in water; solution #3 was a solution containing 15% sodium hexametaphosphate in water, together with sufficient 1% phosphorous acid to achieve a solution pH of 3; solution #4 was a solution containing equal volumetric quantities of 15% sodium hexametaphosphate in water and 15% phosphorous acid in water; solution #5 was a solution containing equal volumetric quantities of 10% stannous chloride in water and 15% phosphorous acid in water; solution #6 was a solution containing equal molar quantities of stannous chloride, phosphorous acid and sodium hexametaphosphate, water; solution #7 was a solution containing equal molar quantities of stannous chloride, phosphoric acid and sodium hexametaphosphate, in water; and solution #8 was a solution containing equal volumetric quantities of 15% stannous chloride in water and 15% sodium hexametaphosphate in water, together with sufficient phosphorous acid to achieve a solution pH of 1.

The following table sets forth the results from this series of tests.

TABLE 1

| Test Solution | Amount Required to Clear Iron Solution |
|---|---|
| 1 | 1.6 ml |
| 2 | 6.0 ml |
| 3 | 8.0 ml |
| 4 | 4.0 ml |
| 5 | 0.8 ml |
| 6 | 6.8 ml |
| 7 | 9.0 ml |
| 8 | 0.6 ml |

The two bottles containing the best test solutions (#5 and #8) were further tested by the addition of 20 ml of crude oil, followed by shaking for approximately 1 minute. Each of the solutions quickly exhibited a separation between oil and aqueous phases, thereby establishing the emulsion-breaking capacity of the test solutions.

Example 2

In this test, four 100 ml bottles each containing 50 ml of 15% HCl solution and 5000 ppm of ferrous/ferric chloride were prepared and used to study the iron-complexing ability of four separate aqueous test solutions. The iron-containing solutions initially exhibited a yellowish tint, and sufficient amounts of the test solutions were added to corresponding iron-containing solutions to clear them, thus indicating that the iron had been complexed.

Solution #9 was made up of 3 ml of 15% stannous chloride in water, 3 ml of 15% sodium hexametaphosphate in water and 5 ml of 15% phosphorous acid; solution #10 was a solution of 15% phosphorous water in water; solution #1 1 was a solution of 15% sodium hexametaphosphate in water; and solution #12 was a solution of 10% stannous chloride in water.

The following table sets forth the results of this series of tests.

TABLE 2

| Test Solution | Amount Required to Clear Iron Solution |
|---|---|
| 9 | 0.05 ml |
| 10 | 1.1 ml |
| 11 | 1.5 ml |
| 12 | 2.5 ml |

The bottle containing the best test solution (#9) was further tested by the addition of 20 ml of crude oil, followed by shaking for approximately 1 minute. The solution quickly exhibited a separation between oil and aqueous phases, thereby establishing the emulsion-breaking capacity of the test solution.

Example 3

The following example sets forth presently preferred solid and liquid products in accordance with the invention.

A solid mixture is made by blending together 93 g of sodium hexametaphosphate, 4.52 g of stannous chloride and 2.5 g of phosphorous acid.

A liquid mixture is made by mixing together 249 lbs. (45.3%) water, 15 lbs. (2.3%) sodium hexametaphosphate, 10 lbs. (1.5%) stannous chloride, 330 lbs. (50.8%) polyphosphoric acid, 0.5 lbs. (0.08%) EDTA. For downhole use, approximately 1–10 gallons (most preferably about 2 gallons) of the liquid mixture are added to 1000 gallons of hydrochloric acid conventionally used for the stimulation of oil and gas wells (3.5–28% HCl).

What is claimed is:

1. A regenerating medium for cation exchange resins, comprising:

a quantity of sodium chloride; and an additive comprising respective minor amounts of a source of $Sn^{+2}$ ion and an acid selected from the group consisting of phosphorous acid, phosphoric acid and mixtures thereof, said $Sn^{+2}$ ion source and acid being mixed with said sodium chloride.

2. The medium of claim 1, said additive being a dispersion in an aqueous medium.

3. The medium of claim 1, said additive being a powdered mixture.

4. The medium of claim 1, said additive being present at a level of from about 0.01–2% by weight.

5. A method of regenerating a cation exchange resin comprising the steps of contacting a resin to be regenerated with a medium in accordance with claim 1.

6. The medium of claim 1, said $Sn^{+2}$ ion source comprising stannous chloride.

7. The medium of claim 1, said $Sn^{+2}$ ion source being present at a level to provide from about 0.3–15% by weight $Sn^{+2}$ ion in said additive.

8. The medium of claim 1, said acid being present at a level of from about 0.1–75% by weight in said additive.

9. The medium of claim 1, including an alkali metal hexametaphosphate.

* * * * *